(12) United States Patent
Clark et al.

(10) Patent No.: US 12,305,689 B2
(45) Date of Patent: May 20, 2025

(54) ISOLATING BLIND HOLE FASTENER

(71) Applicant: Illinois Tool Works Inc., Glenview, IL (US)

(72) Inventors: Chad M. Clark, Stamping Ground, KY (US); Mark O. Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 155 days.

(21) Appl. No.: 18/128,904

(22) Filed: Mar. 30, 2023

(65) Prior Publication Data

US 2023/0313827 A1 Oct. 5, 2023

Related U.S. Application Data

(60) Provisional application No. 63/327,396, filed on Apr. 5, 2022.

(51) Int. Cl.
| | | |
|---|---|---|
| *F16B 2/24* | (2006.01) | |
| *F16B 2/20* | (2006.01) | |
| *F16B 21/12* | (2006.01) | |
| *F16B 37/14* | (2006.01) | |
| *F16B 21/07* | (2006.01) | |

(52) U.S. Cl.
CPC ............... *F16B 37/14* (2013.01); *F16B 2/20* (2013.01); *F16B 2/241* (2013.01); *F16B 21/125* (2013.01); *F16B 21/075* (2013.01)

(58) Field of Classification Search
CPC .. F16B 2/24; F16B 2/241; F16B 2/243; F16B 21/12; F16B 21/125; F16B 21/086; F16B 21/75

USPC ........................................................ 411/508
See application file for complete search history.

(56) References Cited

U.S. PATENT DOCUMENTS

| | | | | |
|---|---|---|---|---|
| 2,084,717 A * | 6/1937 | Wiley | ..................... | F16B 5/125 24/581.1 |
| 3,205,546 A * | 9/1965 | Nelson | .................... | F16B 5/128 24/292 |
| 4,495,380 A * | 1/1985 | Ryan | ...................... | H05K 7/142 24/453 |
| 5,267,125 A * | 11/1993 | Liu | ....................... | H05K 9/0039 24/453 |
| 7,900,953 B2 * | 3/2011 | Slobodecki | ........... | B60R 21/215 280/730.2 |
| 8,316,513 B2 * | 11/2012 | DeJong | ................. | F16B 5/0657 24/294 |
| 8,944,733 B2 * | 2/2015 | Podsadny | ............... | F16B 21/07 24/295 |
| 10,151,458 B2 * | 12/2018 | Baumeister | ........... | F21V 19/004 |
| 11,441,587 B2 * | 9/2022 | Binkert | ................. | F16B 21/086 |

* cited by examiner

*Primary Examiner* — Flemming Saether
(74) *Attorney, Agent, or Firm* — McAndrews, Held & Malloy, Ltd.

(57) ABSTRACT

Described is an isolating fastener assembly for attaching a first component to a blind hole of a second component. The isolating fastener assembly includes a clip and an isolating cap. The clip having a retaining head portion and a body portion. The body portion including a pair of legs spaced apart and flexibly connected to one another at the retaining head portion to define a channel. The isolating cap having a pair of guides. Each guide having a fastener-retention feature to engage and retain the clip.

20 Claims, 9 Drawing Sheets

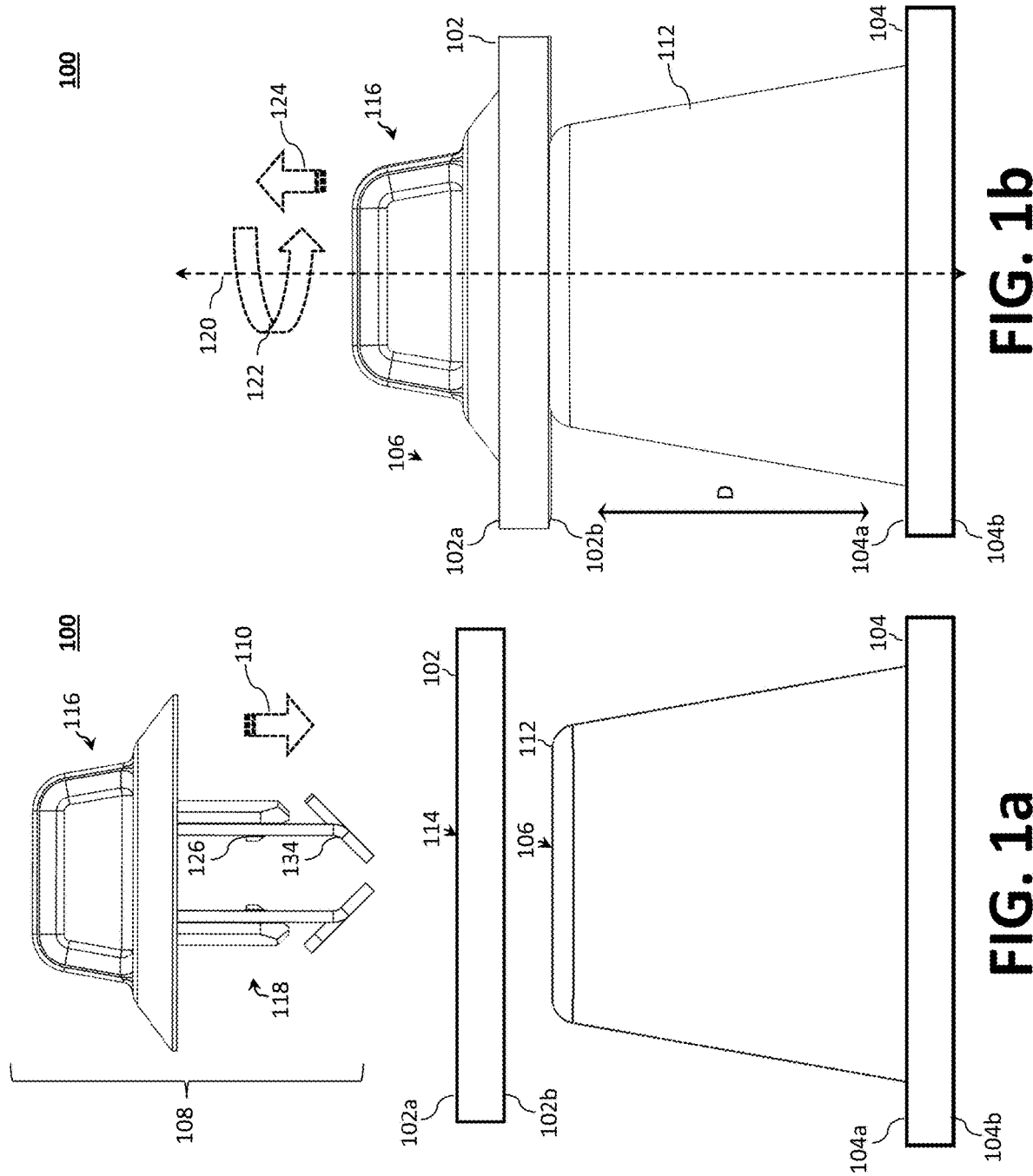

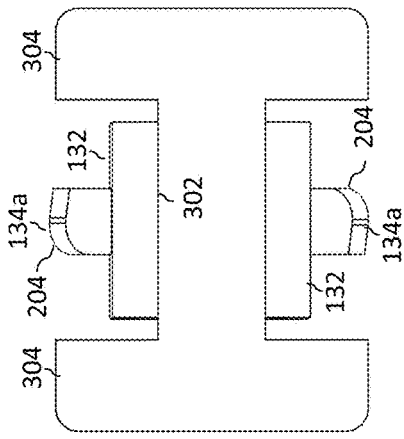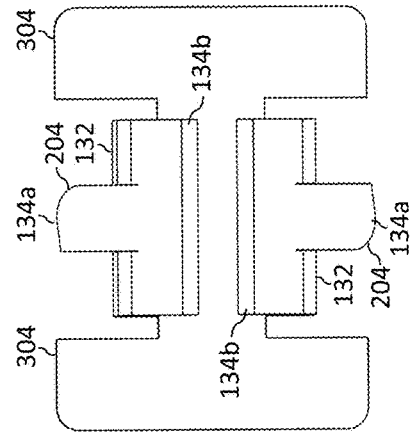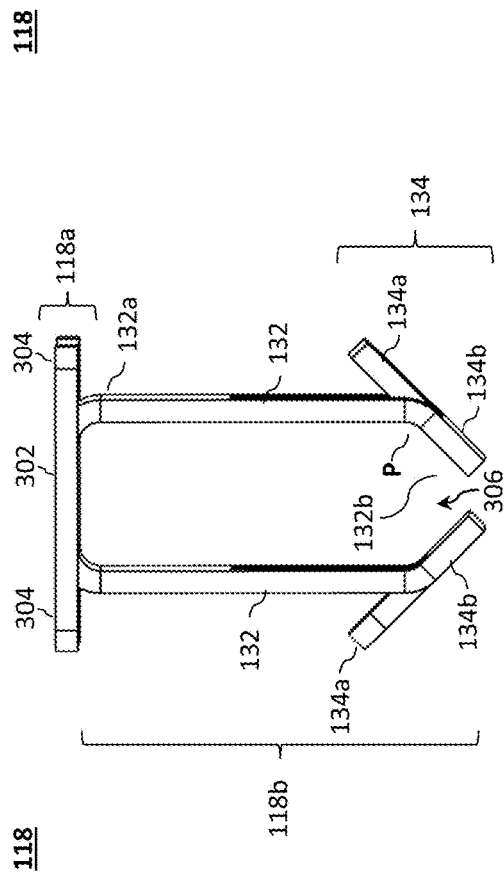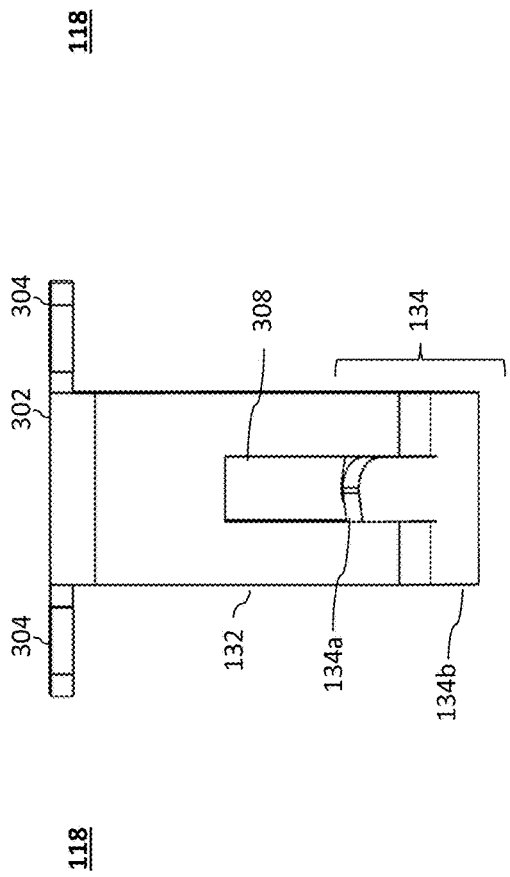

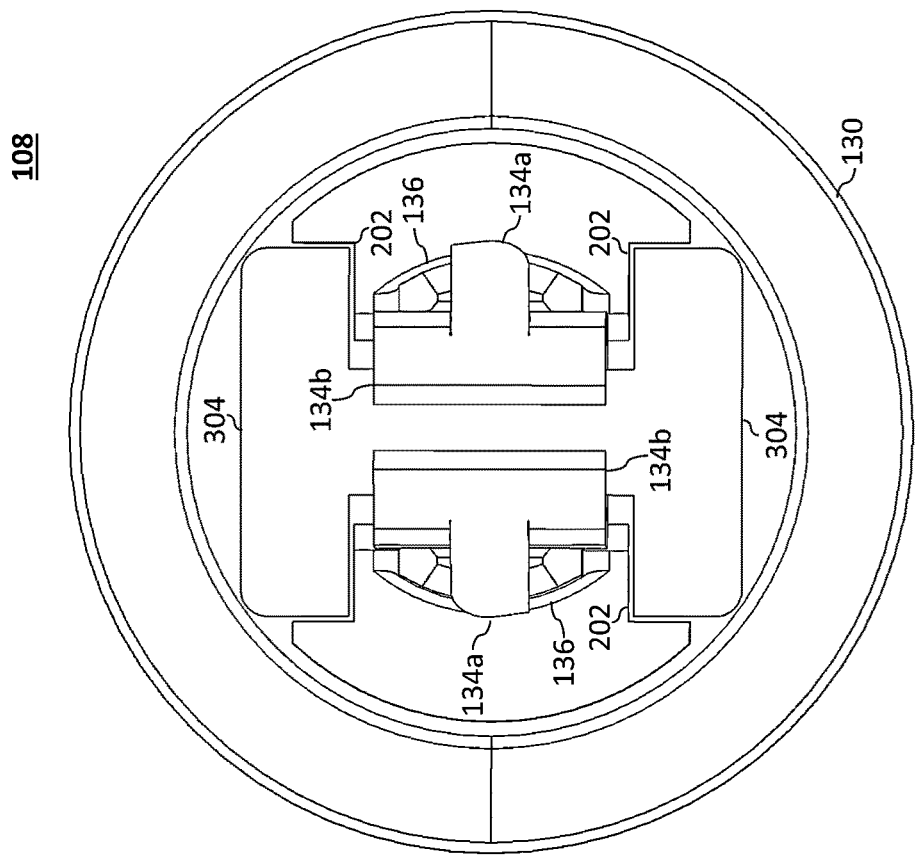
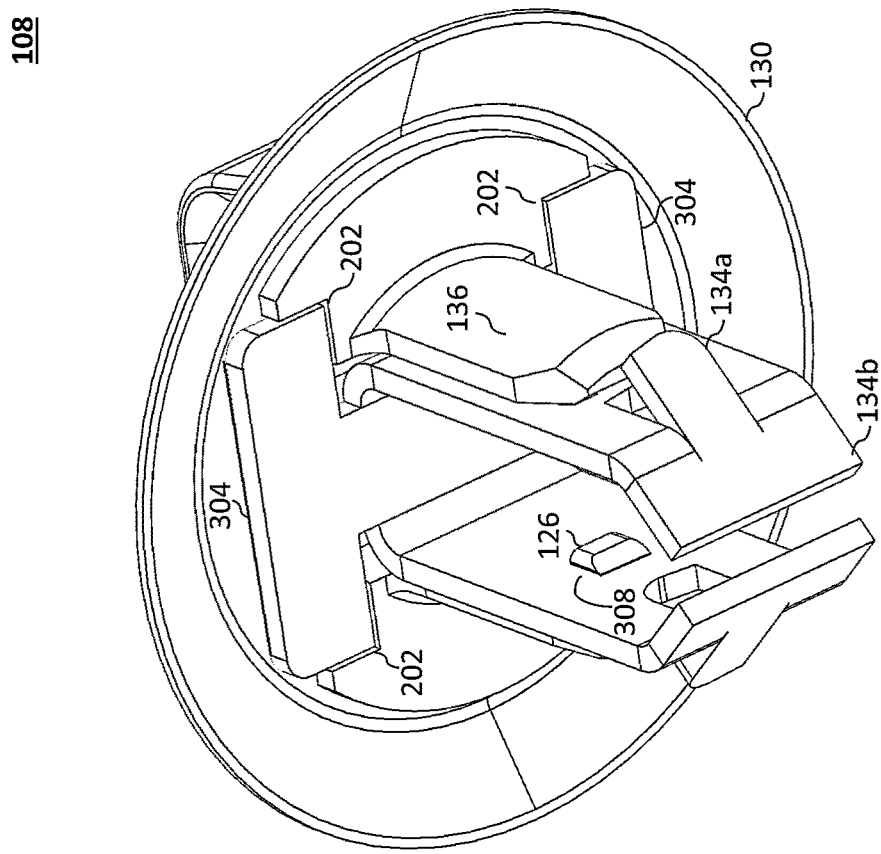

ISOLATING BLIND HOLE FASTENER

RELATED APPLICATION

The present application claims priority to U.S. Provisional Patent Application No. 63/327,396, filed Apr. 5, 2022, which is hereby incorporated by reference in its entirety.

BACKGROUND

Automotive components require fastening techniques that are simple to manufacture and assemble. Further, fastening techniques should above all be reliable and efficient. In some examples, it's beneficial to electrically isolate fastener components.

Despite advancements to date, it would be highly desirable to have a fastening system to form a connection of two or more components, such as automotive panels, using an isolating fastener assembly. For example, an isolating fastener assembly that electrically isolates portions of the fastener assembly from conducting electricity to another component above the isolating cap.

SUMMARY

The present disclosure relates generally to a fastening system to form a connection of two or more components, such as automotive panels, using an isolating fastener assembly, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 1a illustrates a side assembly view of the fastening system in accordance with an aspect of this disclosure.

FIGS. 1b and 1c illustrate, respectively, an assembled side view of the fastening system and a cross-sectional view thereof taken along cutline A-A (FIG. 1d).

FIGS. 3a through 3d illustrate, respectively, first side elevational, second side elevational, top plan, and bottom plan views of the illustrated clip.

FIGS. 4a and 4b illustrate, respectively, an underside isometric and bottom plan views of an assembled fastener assembly in accordance with an aspect of this disclosure.

DESCRIPTION

Figure 1C:
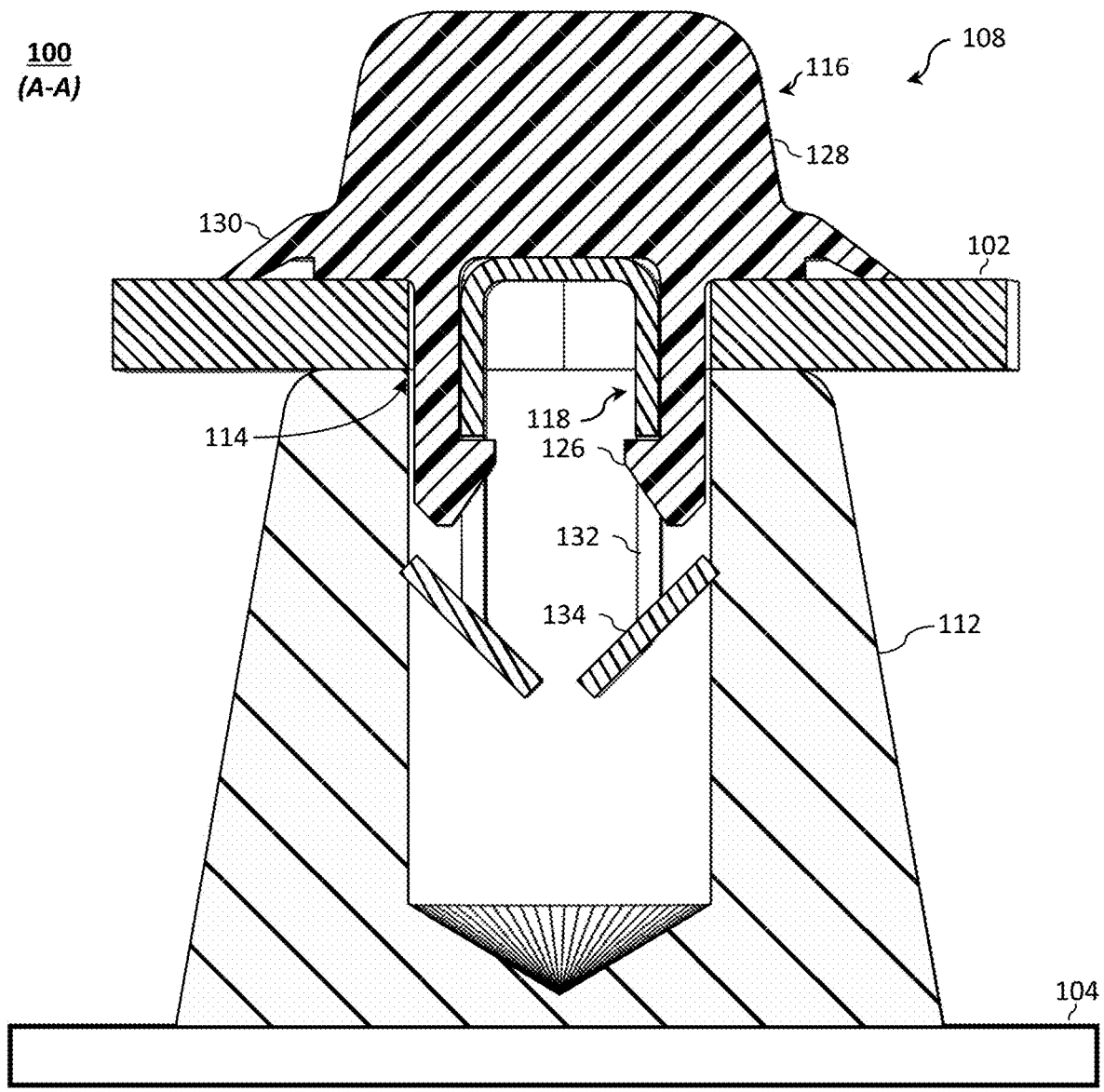

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

A fastener can be used to form a connection between a first component and a second component, such as automotive panels. In one example, an isolating fastener assembly for attaching a first component to a hole component of a second component comprises: a clip having a retaining head portion and a body portion, wherein the body portion includes a pair of legs spaced apart and flexibly connected to one another at the retaining head portion to define a channel; and an isolating cap, wherein the isolating cap comprises a pair of guides, each of said pair of guides having a fastener-retention feature configured to engage and retain the clip.

In another example, an isolating fastener assembly for attaching a first component to a hole component of a second component comprises: a stamped-metal clip having a retaining head portion and a body portion, wherein the body portion includes a pair of legs spaced apart and flexibly connected to one another at the retaining head portion to define a channel; and a plastic isolating cap, wherein the plastic isolating cap comprises a pair of guides, wherein the plastic isolating cap comprises one or more torque interface features formed on a surface thereof and configured to engage the retaining head portion.

In yet another example, an isolating fastener assembly for attaching a first component to a hole component of a second component comprises: a stamped-metal clip having a retaining head portion and a body portion, wherein the body portion includes a pair of legs spaced apart and flexibly connected to one another at the retaining head portion to define a channel, wherein each of pair of legs comprises an aperture formed therein; and a plastic isolating cap, wherein the plastic isolating cap comprises a pair of guides having a fastener-retention feature configured to engage and retain the stamped-metal clip via the aperture, wherein the plastic isolating cap comprises one or more torque interface features formed on a surface thereof that are sized and shaped to receive and engage at least a portion of the retaining head portion.

In some examples, the isolating cap is a plastic component and/or the clip is a stamped-metal component. The isolating cap can comprise one or more torque interface features formed on a surface thereof and configured to engage the retaining head portion. The one or more torque interface features can be sized and shaped to receive at least a portion of the retaining head portion. In some examples, the isolating cap comprises a twist-removal handle to enable a user to remove the isolating fastener assembly from the hole component via a twist-and-pull motion.

In some examples, each of pair of legs comprises: (1) an aperture formed therein and configured to receive the fastener-retention feature of a respective one of said pair of guides; (2) a retaining tab having a first portion configured to engage the hole component and a second portion that serves as a lead-in feature; and/or (3) a retaining tab having a first portion that extends outwardly away from the channel and a second portion that extends inwardly toward the channel. In some examples, the pair of guides is configured to pass through an opening in the first component. In some examples, the isolating cap is configured to electrically isolate the clip.

Figure 1E:
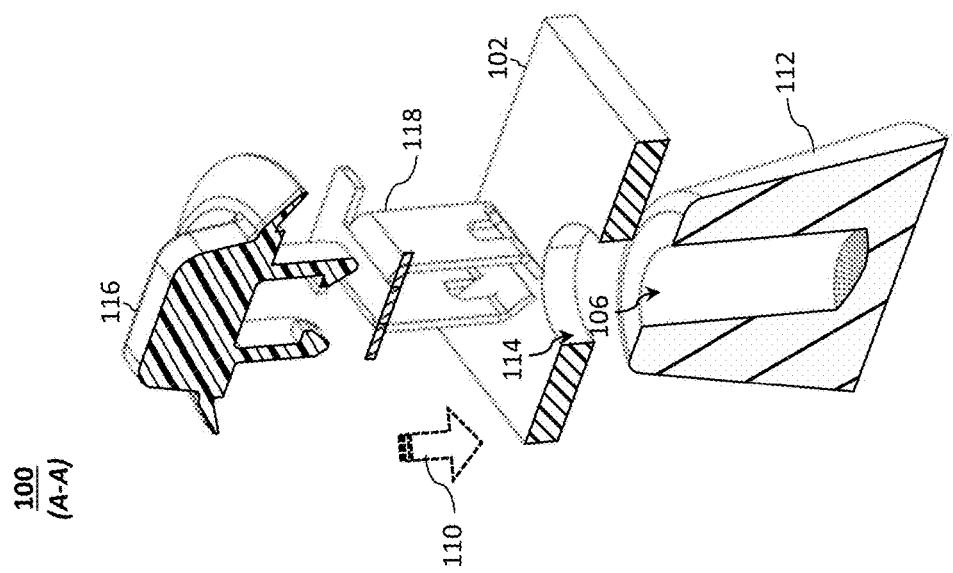
FIGS. 1d and 1e illustrate, respectively, a topside isometric assembly view of the fastening system and a cross-sectional view thereof taken along cutline A-A (FIG. 1d).
Figure 1D:
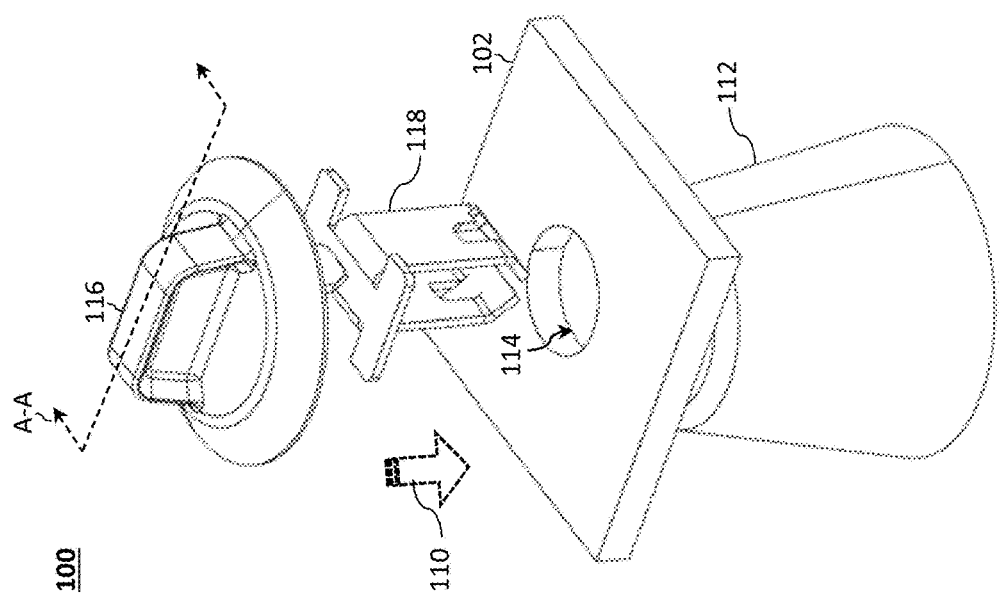
Figure 1F:
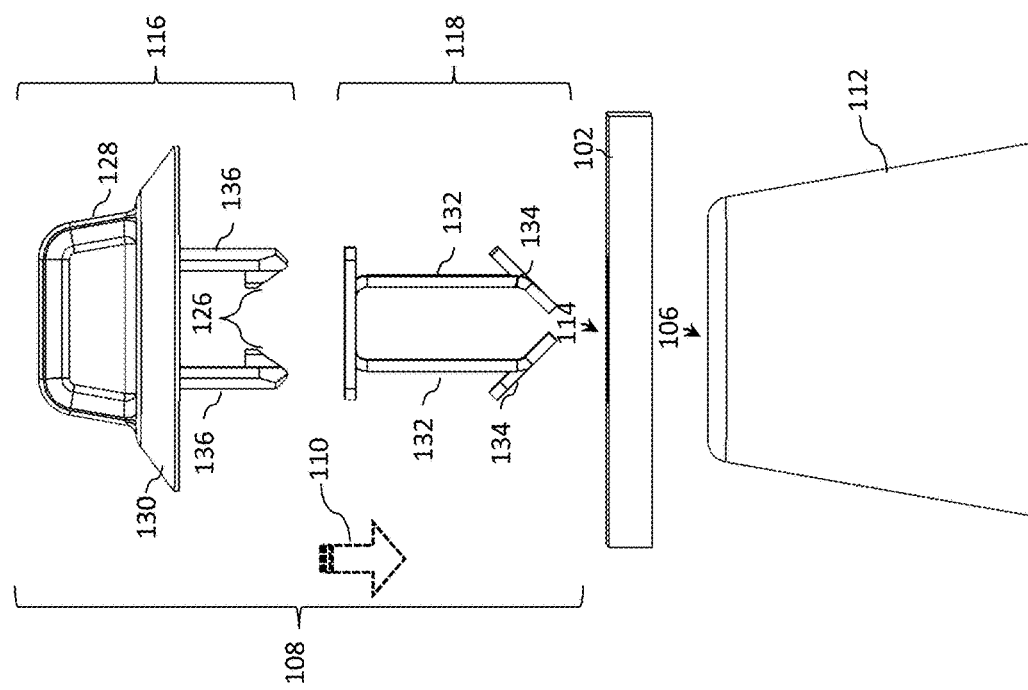
FIGS. 1f and 1g illustrate, respectively, a side isometric assembly view of the fastening system and a cross-sectional view thereof taken along cutline A-A (FIG. 1d).
Figure 1G:
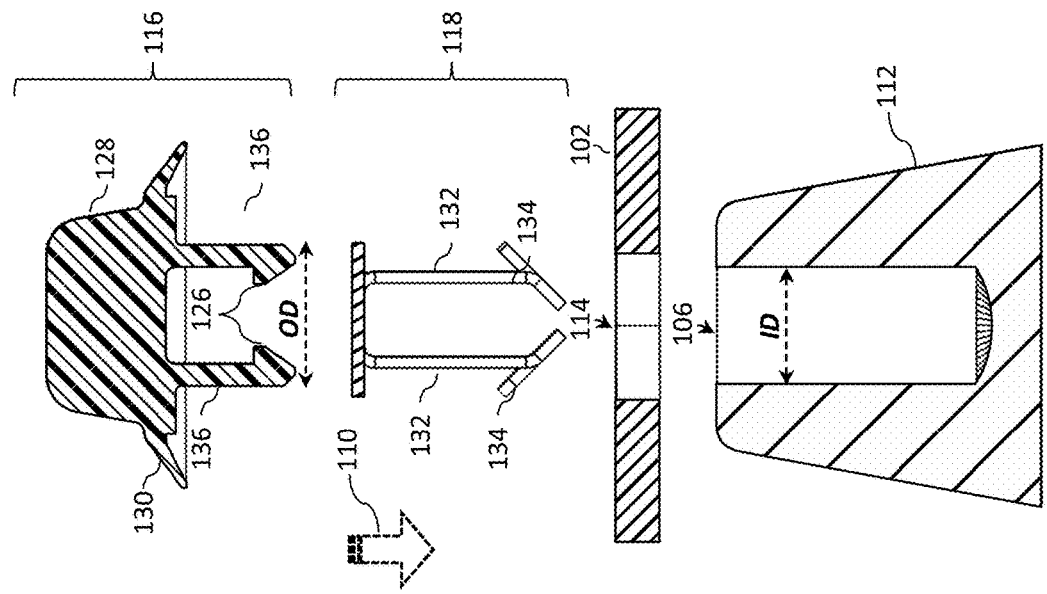
Figure 2C:
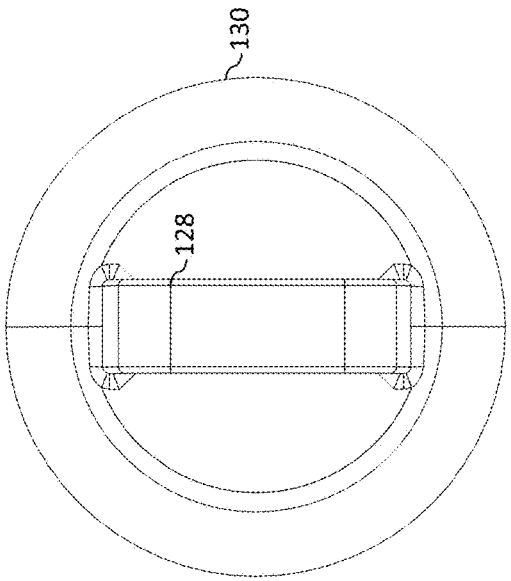
FIGS. 2a through 2d illustrate, respectively, first side elevational, second side elevational, top plan, and bottom plan views of the isolating cap.
Figure 2D:
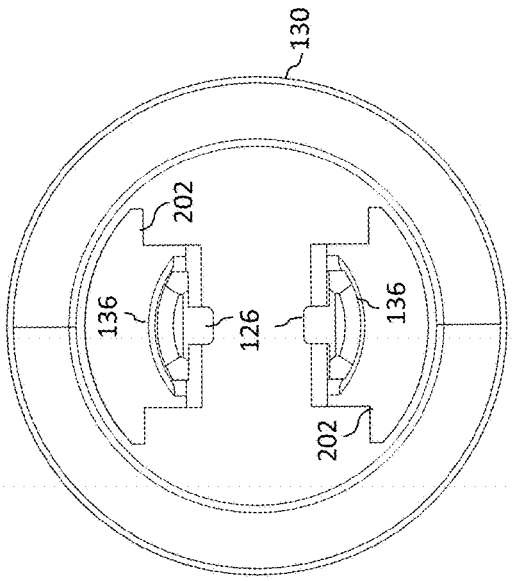
Figure 2A:
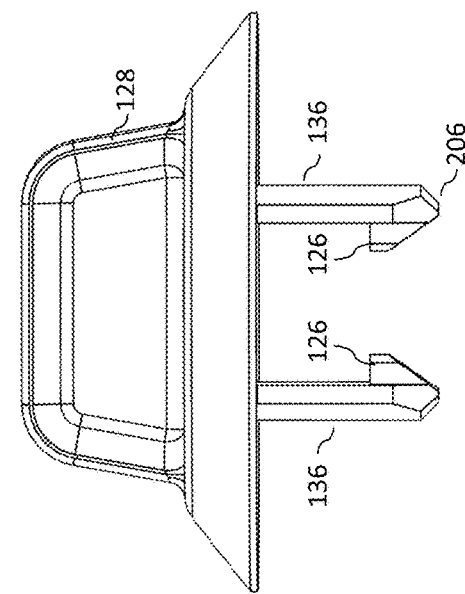
Figure 2B:
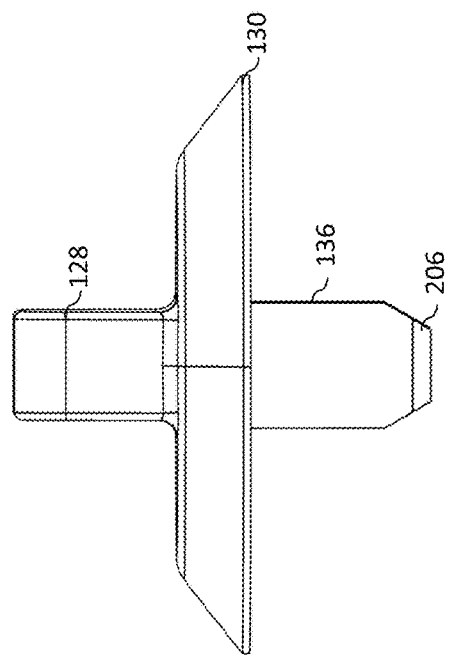

FIGS. 1a through 1g illustrate an example fastening system 100 configured to form an isolated, connection between a first component 102 and a second component 104 in accordance with an aspect of this disclosure. Specifically, FIG. 1a illustrates a side assembly view of the fastening system 100, while FIGS. 1b and 1c illustrate, respectively, an assembled side view of the fastening system 100 and a cross-sectional view thereof taken along cutline A-A (FIG. 1d). FIGS. 1d and 1e illustrate, respectively, a topside isometric assembly view of the fastening system 100 and a cross-sectional view thereof taken along cutline A-A (FIG. 1d). FIG. 1f and 1g illustrate, respectively, a side isometric assembly view of the fastening system 100 and a cross-sectional view thereof taken along cutline A-A (FIG. 1d).

The illustrated fastening system 100 includes the first component 102, the second component 104, and a fastener assembly 108 configured to engage a blind-hole component 112 associated with the second component 104. The blind-hole component 112 can be integrated with the second component 104 or attached thereto. After the first component 102 and the second component 104 are assembled, as best illustrated in FIGS. 1b and 1c, the second component 104 is covered at least partially by the first component 102 and, in some cases, separated by an assembled distance (D) between the first and second components 102, 104 (i.e., that between the A-side surface 102a and the B-side surface 104b).

The fastener assembly 108 is configured to engage a cavity 106 defined by the blind-hole component 112 (e.g., during installation) through a push motion as indicated by arrow 110, and to disengage the blind-hole component 112 (e.g., during removal) through a twist-and-pull motion—i.e., a twist motion about the central longitudinal axis 120 as indicated by arrow 122 and a pull motion of the fastener assembly 108 away from the blind-hole component 112 as indicated by arrow 124. Removal of the fastener assembly 108 via a simple twist-and-pull motion increases serviceability, thus making it easier to disassemble and remove a component (e.g., the first or second component 102, 104) from a vehicle assembly.

The fastener assembly 108 is illustrated as a multi-component fastener assembly 108 having an isolating cap 116 (e.g., an electrically isolating cap) and a clip 118 (e.g., a metal retainer clip). The clip 118 serves to mechanically couple the first and second components 102, 104, while the isolating cap 116 serves to electrically isolate a portion of the fastener assembly 108 (e.g., the metal clip 118) from conducting electricity to another component above the isolating cap 116. FIGS. 2a through 2d illustrate, respectively, first side elevational, second side elevational, top plan, and bottom plan views of the isolating cap 116, while FIGS. 3a through 3d illustrate, respectively, first side elevational, second side elevational, top plan, and bottom plan views of the clip 118.

The illustrated fastener assembly 108 uses a hybrid material construction to leverage the advantages of the individual materials, while minimizing their disadvantages. To that end, as will be discussed, the isolating cap 116 and the clip 118 can be fabricated as separate components and of different materials. It is contemplated that certain components of the fastener assembly 108 may be fabricated as a stamped-metal component using a metal stamping technique, while others can be formed using a plastic injection technique. For example, the clip 118 can be fabricated as a stamped-metal component from metal using a metal stamping technique, whereas the isolating cap 116 can be fabricated from a plastic material using a plastic injection technique, additive manufacturing, or otherwise. Using metal for the clip 118, for example, is advantageous because the fastener assembly 108 can retain the fastening between the first and second components 102, 104 even when temperatures get hot enough to melt plastic components. Thus, even if the plastic isolating cap 116 were damaged or melted away, the connection between the first and second components 102, 104 would still be maintained by the metal clip 118.

In some examples, one or more components of the fastening system 100 (e.g., the plastic components) may be fabricated as a printed thermoplastic material component that can be printed via an additive manufacturing techniques with great accuracy and with numerous details. In addition, additive manufacturing techniques obviate the need for mold tooling typically associated with plastic injection molding, thereby lowering up-front manufacturing costs, which is particularly advantageous in low-volume productions. In some examples, the plastic components may be fabricated using material extrusion (e.g., fused deposition modeling (FDM), stereolithography (SLA), selective laser sintering (SLS), material jetting, binder jetting, powder bed fusion, directed energy deposition, VAT photopolymerisation, and/or any other suitable type of additive manufacturing/3D printing process.

Additive manufacturing techniques print objects in three dimensions, therefore both the minimum feature size (i.e., resolution) of the X-Y plane (horizontal resolution) and the layer height in Z-axis (vertical resolution) are considered in overall printer resolution. Horizontal resolution is the smallest movement the printer's extruder can make within a layer on the X and the Y axis, while vertical resolution is the minimal thickness of a layer that the printer produces in one pass. Printer resolution describes layer thickness and X-Y resolution in dots per inch (DPI) or micrometers (μall). The particles (3D dots) in the horizontal resolution can be around 50 to 100 μm (510 to 250 DPI) in diameter. Typical layer thickness (vertical resolution) is around 100 μm (250 DPI), although the layers may be as thin as 16 μm (1,600 DPI). The smaller the particles, the higher the horizontal resolution (i.e., higher the details the printer produces). Similarly, the smaller the layer thickness in Z-axis, the higher the vertical resolution (i.e., the smoother the printed surface will be). A printing process in a higher vertical resolution printing, however, will take longer to produce finer layers as the printer has to produce more layers. In some examples, one or more of the plastic components may be formed or otherwise fabricated at different resolutions during a printing operation. For example, engagement features of the isolating cap 116 may be printed at a higher resolution than its twist-removal handle 128, for example.

The first component 102 may include, define, or otherwise provide an opening 114 through which a fastener assembly 108 can be passed at least partially to engage a blind-hole component 112 associated with the second component 104. For example, the clip 118 of the fastener assembly 108 can be passed at least partially through the opening 114 to engage the blind-hole component 112.

The first component 102 and the second component 104 may be, for example, automotive panels or other automotive components. Depending on the application, one or both of the first component 102 and/or the second component 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In one example, the first component 102 is an automotive secondary component and the second component 104 is an automotive primary component. In the automotive industry, example first components 102 include, without limitation, door trim panels, moldings, trim pieces, and other substrates (whether used as interior or exterior surfaces).

The first component 102 may define an A-side surface 102a (e.g., a first surface) and a B-side surface 102b (e.g., a second surface, illustrated as an undersurface). The A-side surface 102a, also called a class A surface, is typically the surface that is visible after assembly and, for that reason, is more aesthetically pleasing (e.g., textured, coated, or otherwise decorated) and typically free of attachment devices and/or related features. Conversely, the B-side surface 102b, also called a class B surface, is typically the surface that is not visible after assembly and typically includes various attachment devices and/or related features.

As illustrated, the second component 104 may include, define, or otherwise provide the blind-hole component 112 (e.g., a molding, a cast boss, or other component that defines a cavity), which may be formed during manufacturing of the second component 104 or attached during assembly (e.g., via adhesives, a welding process, a mechanical coupling, or the like). The second component 104 may be, for example, a structural component of a vehicle, such as engine bay components, doors, pillars (e.g., an A-pillar, B-pillar, C-pillar, etc.), dashboard components (e.g., a cross member, bracket, frame, etc.), seat frames, center consoles, fenders, sheet metal framework, or the like. The second component 104 may likewise define an A-side surface 104a (e.g., a first surface, such as an exterior surface) and a B-side surface 104b (e.g., a second surface, such as an interior surface).

To form the connection between the first component 102 and the second component 104, the fastener assembly 108 is passed through the opening 114 and inserted into a cavity of 106 the blind-hole component 112 formed in or on a surface of the second component 104 as indicated by the arrow 110. In some examples, the fastener assembly 108 may include features to absorb movement, such as ribs and wings to mitigate noise and/or rattle between the first and second components 102, 104 and mitigating risk of the fastening system 100 becoming loose.

As best illustrated in FIGS. 2a through 2d, the isolating cap 116 generally comprises a twist-removal handle 128, an electrically-isolating cap 130, and a pair of guides 136. The twist-removal handle 128, the electrically-isolating cap 130, and the pair of guides 136 can be formed as a unitary structure. While the isolating cap 116 is illustrated with a twist-removal handle 128 for hand manipulation, additionally or alternatively, the isolating cap 116 could include a tool feature to enable use of a tool during removal, such as a screwdriver or socket (e.g., a Hex socket, a Torx socket, etc.). To that end, the isolating cap 116 could include a tool feature (e.g., a shaped projection or recess) configured to engage such a tool.

As best illustrated in FIG. 1g, the illustrated pair of guides 136 are sized and shaped with an outer diameter (OD) that generally corresponds to the inner diameter (ID) of the cavity 106. That is, the outer diameter (OD) may be equal to or slightly less than, the inner diameter (ID) to provide a snug fit. Each of the illustrated pair of guides 136 includes a fastener-retention feature 126 and a lead-in feature 206. The underside of the electrically-isolating cap 130 (i.e., the surface of the electrically-isolating cap 130 that faces the A-side surface 102a upon assembly) can further include one or more torque interface features 202 configured to engage the clip 118. The one or more torque interface features 202 can be provided as ridges, walls, recesses, or the like. For example, the one or more torque interface features 202 can be sized and shaped to receive at least a portion of the retaining head portion 118a.

The clip 118 can be formed from a single sheet of metal through, for example, a metal stamping technique. As best illustrated in FIGS. 3a through 3d, the illustrated clip 118 generally comprises a retaining head portion 118a (e.g., a panel retention head) and a body portion 118b. With reference to FIGS. 3c and 3d, the illustrated retaining head portion 118a comprises a pair of spaced-apart wings 304 joined to one another via a cross member 302 to form, in this example, an H-shaped retaining head portion 118a. Other shapes, however, are contemplated.

The body portion 118b is formed from a pair of opposing legs 132 that are resiliently connected at their upper ends 132a at or adjacent the cross member 302 of the retaining head portion 118a (e.g., a portion that defines the bend, joint, etc.) to form, in one example, a generally U-shaped body having a channel 306 (e.g., a U-shaped channel) therebetween. The pair of opposing legs 132 are resiliently connected in that the pair of opposing legs 132 default (e.g., spring back) to a predetermined shape. For example, as best illustrated in FIG. 3a, the body portion 118b has a side profile that is generally U-shaped.

During assembly, the legs 132 may be biased (e.g., pushed) inward and/or outward, but, in the absence of such external forces, return to the generally U-shaped shape. As illustrated, the pair of legs 132 are generally parallel to one another. Alternatively, the legs 132 may be angled or biased outwardly at the bottom end such that the pair of legs 132 spread outwardly at their bottom ends 132b.

Each of the legs 132 has an aperture 308 formed therethrough to serve as a retention window to the fastener-retention feature 126 of the isolating cap 116. While the size and shape of the aperture 308 can vary, the aperture may be generally rectangular (as illustrated), square, or another polygon. The aperture 308 and one or more retaining tabs 134, can be formed through a metal stamping and bending process. In the illustrated example, one or both legs 132 can be stamped to define the aperture 308 and then the bottom ends 132b can be bent at point (P) to form one or more retaining tabs 134 adjacent the aperture 308 of one or both legs 132. Therefore, the retaining tab 134 may integral with its respective leg 132.

The illustrated retaining tabs 134 on opposite sides of the channel 306 are symmetrical with respect to one another relative to the central longitudinal axis 120. As illustrated, each of the one or more retaining tabs 134 includes a first portion 134a that extends outwardly (i.e., away from the central longitudinal axis 120 and channel 306) and a second portion 134b that extends inwardly (i.e., toward the central longitudinal axis 120 and channel 306). As illustrated, the first portion 134a generally corresponds to the size and shape of the portion of the legs 132 that was stamped to form the aperture 308, but the first portion 134a can be further shaped to assist the user during operation. For example, as illustrated, a corner of the first portion 134a may be shaped as a rounded corner 204 (rather than squared) to assist during the twist-and-pull motion during removal. In some examples, the first portion 134a may be provided with at least one sharp edge to better grasp or engage the blind-hole component 112 upon assembly, such as barbs or teeth to engage an interior wall of the cavity 106. The second portion 134b is configured to serve as the blind hole lead-in feature in to assist with alignment during assembly. While each of the legs 132 is illustrated with one or more retaining tabs 134, one of skill in the art would understand that only one of the two legs 132 may be provided with a retaining tabs 134. Accordingly, in some examples, the one or more retaining tabs 134 may be provided on only one side of the channel 306.

FIGS. 4a and 4b illustrate, respectively, an underside isometric and bottom plan views of an assembled fastener assembly 108 in accordance with an aspect of this disclosure. As illustrated, the fastener-retention features 126 of the isolating cap 116 each engage a leg 132 by passing at least partially through the aperture 308 to thereby couple the isolating cap 116 and the clip 118 relative to one another. Thus, each aperture 308 is configured to receive the fastener-retention feature 126 of a respective one of said pair of guides 136. Further, as illustrated, the shape of the retaining head portion 118a generally corresponds to the shape defined by the one or more torque interface features 202 formed on the underside surface of the electrically-isolating cap 130.

During operation, the one or more torque interface features 202 engage the retaining head portion 118a to enable torque transfer from the isolating cap 116 to the clip 118 during the twist-and-pull motion during removal. That is, during removal, the operator engages and turns the isolating cap 116 (e.g., via the twist-removal handle 128 or otherwise), which, in turn, turns the clip 118 to disengage the clip 118 from the blind-hole component 112. For example, the first portion 134a of the one or more retaining tabs 134 can form their own thread in the inner diameter (ID) surface of the cavity 106 defined by the blind-hole component 112, allowing the fastener assembly 108 to unscrew.

Figure 5A:
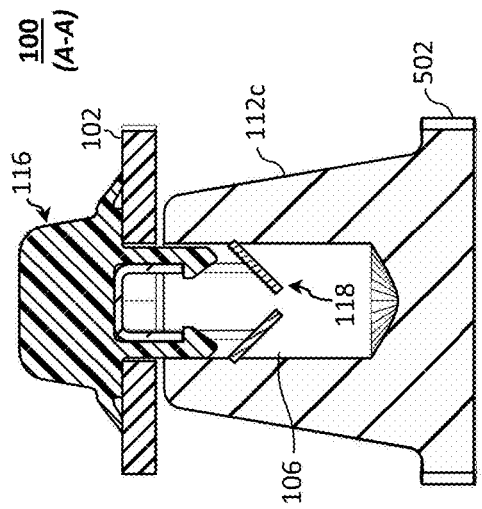
FIGS. 5a through 5d illustrate cross-sectional views of the fastener assembly with hole components taken along cutline A-A in accordance with other aspects of this disclosure.
Figure 5B:
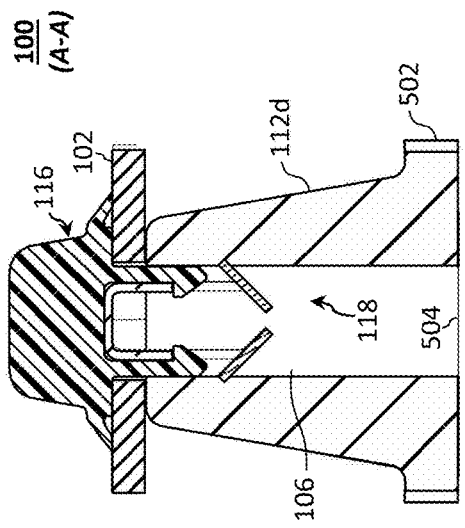
Figure 5C:
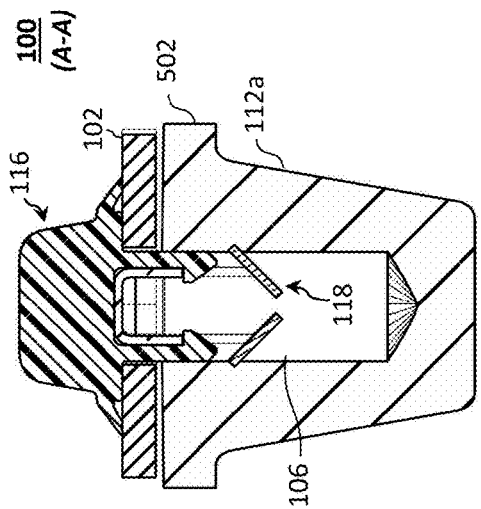
Figure 5D:
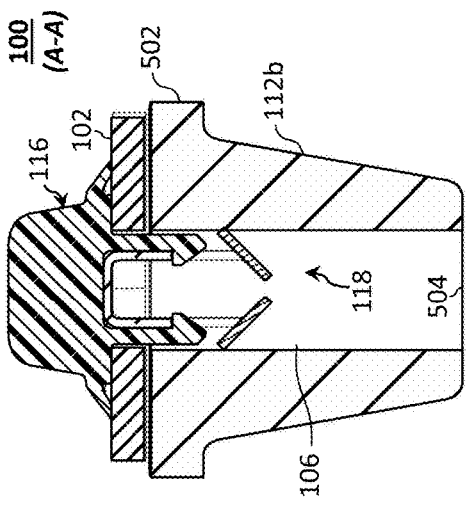

While the previously described figures illustrate an example blind-hole component 112, the fastener assembly 108 disclosed herein can be used with virtually any hole component that defines a cavity 106. FIGS. 5a through 5d illustrate cross-sectional views of other hole components taken along cutline A-A in accordance with other aspects of this disclosure. The other holes components can include blind-hole components and through-hole components, with and without bosses. FIG. 5a illustrates a blind-hole component 112a with the boss 602 at the end of the blind-hole component 112a adjacent the first component 102. FIG. 5b illustrates a through-hole component 112b with the boss 602 at the end of the blind-hole component 112b adjacent the first component 102 and an opening 504 at the opposite end. FIG. 5c illustrates a blind-hole component 112c with the boss 602 at the end of the blind-hole component 112c opposite that of the first component 102. FIG. 5d illustrates a through-hole component 112d with the boss 602 and an opening 504 at the end of the blind-hole component 112d opposite that of the first component 102.

Figure 6:
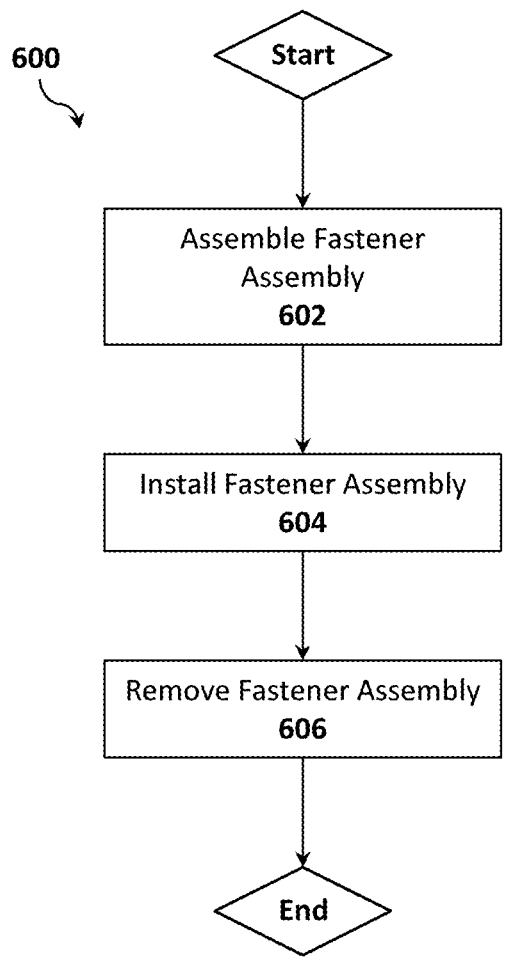
FIG. 6 illustrates a method of assembling, installing, and removing a fastener assembly configured to couple a first component relative to a second component.

FIG. 6 illustrates a method 600 of assembling, installing, and removing a fastener assembly 108 configured to couple a first component 102 relative to a second component 104.

At step 602, the isolating cap 116, which can be injection-molded or otherwise fabricated using a plastic material, is pushed over and/or onto the clip 118. Once fully pushed together, the fastener-retention features 126 of the isolating cap 116 attach to the aperture 308 of the clip 118 to yield a fastener assembly 108. The fully assembled fastener assembly 108 can then shipped to a customer as desired, whether an original equipment manufacturer (OEM) or tier supplier.

At step 604, and with reference to FIG. 1a, the assembled fastener assembly 108 is pushed through an opening 114 in a first component 102 and into a cavity 106 defined by the blind-hole component 112. This step could be performed, by the customer (e.g., an OEM, tier supplier, etc.).

At step 606, and with reference to FIG. 1b, the fastener assembly 108 can be unfastened from the blind-hole component 112 if and when desired or required by turning the fastener assembly 108 as about the central longitudinal axis 120 as indicated by arrow 122 and then a pull motion of the fastener assembly 108 away from the blind-hole component 112 as indicated by arrow 124.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. An isolating fastener assembly for attaching a first component to a hole component of a second component, the isolating fastener assembly comprising:
   a clip having a retaining head portion and a body portion, wherein the body portion includes a pair of legs spaced apart and flexibly connected to one another at the retaining head portion to define a channel; and
   an isolating cap, wherein the isolating cap comprises a pair of guides extending away from an underside surface of the isolating cap, each of said pair of guides having a fastener-retention feature configured to engage and retain the clip via one of the pair of legs.

2. The isolating fastener assembly of claim 1, wherein the isolating cap is a plastic component.

3. The isolating fastener assembly of claim 2, wherein the clip is a stamped-metal component.

4. The isolating fastener assembly of claim 1, wherein the isolating cap comprises one or more torque interface features formed on a surface thereof and configured to engage the retaining head portion.

5. The isolating fastener assembly of claim 4, wherein the one or more torque interface features are sized and shaped to receive at least a portion of the retaining head portion.

6. The isolating fastener assembly of claim 1, wherein the isolating cap comprises a twist-removal handle to enable a user to remove the isolating fastener assembly from the hole component via a twist-and-pull motion.

7. The isolating fastener assembly of claim 1, wherein each of pair of legs comprises an aperture formed therein and configured to receive the fastener-retention feature of a respective one of said pair of guides.

8. The isolating fastener assembly of claim 1, wherein each of pair of legs comprises a retaining tab having a first portion configured to engage the hole component and a second portion that serves as a lead-in feature.

9. The isolating fastener assembly of claim 1, wherein each of pair of legs comprises a retaining tab having a first portion that extends outwardly away from the channel and a second portion that extends inwardly toward the channel.

10. The isolating fastener assembly of claim 1, wherein the pair of guides is configured to pass through an opening in the first component.

11. The isolating fastener assembly of claim 1, wherein the isolating cap is configured to electrically isolate the clip.

12. An isolating fastener assembly for attaching a first component to a hole component of a second component, the isolating fastener assembly comprising:
   a stamped-metal clip having a retaining head portion and a body portion, wherein the body portion includes a pair of legs spaced apart and flexibly connected to one another at the retaining head portion to define a channel; and
   a plastic isolating cap, wherein the plastic isolating cap comprises a pair of guides extending away from an underside surface of the isolating cap to engage the stamped-metal clip, wherein the plastic isolating cap comprises one or more torque interface features formed on a surface thereof and configured to engage the retaining head portion.

13. The isolating fastener assembly of claim 12, wherein each of said pair of guides having a fastener-retention feature configured to engage and retain the stamped-metal clip.

14. The isolating fastener assembly of claim 13, wherein each of pair of legs comprises an aperture formed therein and configured to receive the fastener-retention feature of a respective one of said pair of guides.

15. The isolating fastener assembly of claim 12, wherein the plastic isolating cap comprises a twist-removal handle to enable a user to remove the isolating fastener assembly from the hole component via a twist-and-pull motion.

16. The isolating fastener assembly of claim 12, wherein each of pair of legs comprises a retaining tab having a first portion configured to engage the hole component and a second portion that serves as a lead-in feature.

17. The isolating fastener assembly of claim 12, wherein each of pair of legs comprises a retaining tab having a first portion that extends outwardly away from the channel and a second portion that extends inwardly toward the channel.

18. The isolating fastener assembly of claim 12, wherein the pair of guides is configured to pass through an opening in the first component.

19. An isolating fastener assembly for attaching a first component to a hole component of a second component, the isolating fastener assembly comprising:
   a stamped-metal clip having a retaining head portion and a body portion,
   wherein the body portion includes a pair of legs spaced apart and flexibly connected to one another at the retaining head portion to define a channel,
   wherein each of pair of legs comprises an aperture formed therein; and
   a plastic isolating cap,
   wherein the plastic isolating cap comprises a pair of guides extending away from an underside surface of the isolating cap, each of the pair of guides having a fastener-retention feature configured to engage and retain the stamped-metal clip via the aperture, and
   wherein the plastic isolating cap comprises one or more torque interface features formed on a surface thereof that are sized and shaped to receive and engage at least a portion of the retaining head portion.

20. The isolating fastener assembly of claim 19, wherein each of pair of legs comprises a retaining tab having a first portion configured to engage the hole component and a second portion that serves as a lead-in feature.

* * * * *